United States Patent [19]

Lehnhert

[11] 4,144,521
[45] Mar. 13, 1979

[54] SIGNAL GENERATOR FOR A FLUID-LEVEL INDICATOR

[75] Inventor: Gunter Lehnhert, Rüsselsheim, Fed. Rep. of Germany

[73] Assignee: General Motors Corporation, Detroit, Mich.

[21] Appl. No.: 867,708

[22] Filed: Jan. 9, 1978

[30] Foreign Application Priority Data

Jan. 15, 1977 [DE] Fed. Rep. of Germany ....... 2701572

[51] Int. Cl.² ........................................... G08B 21/00
[52] U.S. Cl. ...................................... 340/59; 340/625; 116/110
[58] Field of Search ................. 340/59, 618, 623, 625; 116/109, 110

[56] References Cited

U.S. PATENT DOCUMENTS 2,058,067  10/1936  Durant ................................. 340/220

Primary Examiner—Alvin H. Waring

Attorney, Agent, or Firm—K. H. MacLean, Jr.

[57] ABSTRACT

A signal generator for a fluid-level indicator in a motor vehicle which converts the pivotal movement of a pivot in the indicator produced by the rise and fall of a float in a fuel tank of the vehicle into digital binary coded electrical signals by means of digital binary coding means mechanically connected to said pivot, said digital binary coded signals being fed to an integrated switching circuit of the signal generator, the outputs from the switching circuit being enabled in sequence when, for example, the float rises from a minimum height in the fuel tank to a maximum height therein, each one of said outputs being connectable to a corresponding electrically-energizable light means, such as a luminous diode, associated with an illuminable display panel situated on an instrument panel of the vehicle. In a preferred embodiment of the invention, it is possible to transmit at least five separate digital binary coded signals from the digital binary coding means to the integrated switching circuit using a two-strand electrical connecting cable.

5 Claims, 3 Drawing Figures

SIGNAL GENERATOR FOR A FLUID-LEVEL INDICATOR

The invention relates to a signal generator for a fluid-level indicator, particularly for monitoring the fuel level in the tank of a motor vehicle, which is controlled by a float arranged on the surface of the fuel and whose mechanical deflection is converted into a digital binary signal and is delivered in this form to an indicating device.

Already well known is a device for sampling in digital form the data values obtained in fluid-level meters (German specification No. DOS. 2,426,085) by making use of an optical coding device which, when supply voltage is present, converts the angular position of a shaft into an electrical digital signal which is available at an output of the device in bit-parallel binary coded form and can be fed into a receiving and indicating system. The known device is of complicated design however, both with regard to its mechanical as well as its electronic structural layout.

It is also known from German patent specification No. 831,914 to provide the transmitter of an electric fuel gauge with various contacts which, depending on the level of the fuel, are swept by a spring contact. A five-strand cable leads from the transmitter to five miniature indicating bulbs which correspond to the fuel levels "full", "$\frac{3}{4}$", "$\frac{1}{2}$", "$\frac{1}{4}$" and "empty". The disadvantage of this known fuel gauge is the need for a five-strand cable between the indicating instrument and transmitter, as well as the requirement for a sprung contact arm.

It is the aim of the present invention to provide a means of producing a fuel-level gauge of the above-mentioned kind which distinguishes itself particularly by its simplicity and uncomplicated design and is especially suitable for the conditions prevailing in a motor vehicle.

A signal generator according to the invention, for a fluid-level indicator in a motor vehicle to monitor the fuel level in a fuel tank of said vehicle, said vehicle including an instrument panel having mounted thereon an illuminable display device, said display device comprising a plurality of illuminable display panels, each of which carries a visible inscription and is illuminable by a respective electrically-energizable light means, said fluid-level indicator including float means suspended in the fuel of said fuel tank, lever transmission means connected to said float means, and a pivot connected to said lever transmission means in such a manner that movement of the float means in response to changes in the fuel level produces corresponding pivotal movement of said pivot, comprises digital binary coding means mechanically connectable to said pivot so as to transform the pivotal movement thereof into corresponding digital binary coded signals, and an integrated switching circuit for receiving said corresponding digital binary coded signals as inputs thereto, said switching circuit having a plurality of outputs therefrom, each one of which is connectable to a respective one of said respective energisable light means, each one of said outputs being enabled in sequence by the serial changes in the digital binary coded signals produced by the pivotal movement of said pivot through a predetermined angle corresponding to the movement of the float means produced by the change in fuel level between a predetermined minimum level and a predetermined maximum level.

Thus, a preferred embodiment of the signal generator of the invention provides that the digital binary coding means has two radially spaced conductive tracks and two sliding contacts which are assigned to these latter and are connected to the pivot of the fuel-level indicator. Advantageously the tracks are shaped along their lengths so as to provide successively four different regions, through which move the two sliding contacts and in which both tracks contact, both do not contact, or one contacts and the other one does not contact the respective sliding contact. It is also appropriate to provide a fifth region for the tracks in which both tracks have a very high resistance, but still conduct when contacted by the respective sliding contact.

By reason of this preferred formation of the conductive tracks, it is possible for a two-strand cable to transmit to the vehicle instrument panel a total of four or even five different binary coded signals, each of which is able to light up its assigned indicating lamp in the instrument panel. Preferably, the first four regions are assigned to the fuel levels "full", "$\frac{3}{4}$", "$\frac{1}{2}$" and "$\frac{1}{4}$". Preferably the fifth region corresponds to the filling level "Reserve".

According to an embodiment which is particularly advantageous from a constructional aspect, the sliding contacts are arranged on two pivoting arms which are superimposed upon each other, spaced apart, and are mounted on a common shaft. In conjunction with the conductor tracks preferably designed as a printed circuit, this embodiment is very compact and space-saving so that it can be readily accommodated in relatively inaccessible places in the vehicle. The signal generator can also be produced with little constructional outlay. It delivers signals from the integrated switching circuit thereof which, when fed to luminous semi-conductor diodes, are converted into an optical indication of fuel-level in a very simple and space-saving manner.

The object and advantages of the present invention will be apparent from the following detailed description, wherein the preferred embodiment of the invention will now be described with reference to the accompanying drawings, in which.

Figure 1:
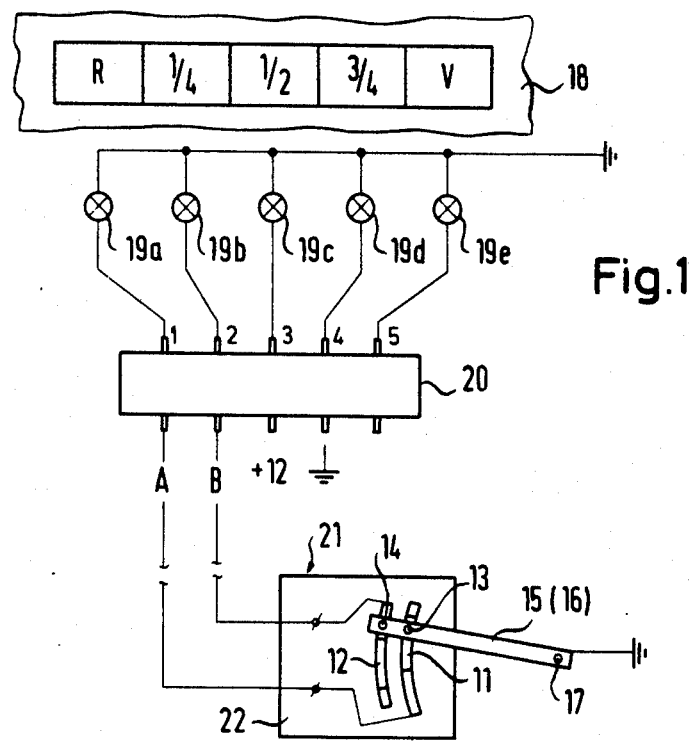
FIG. 1 is a schematic presentation of a fuel-level indicating instrument fitted with a signal generator according to the invention.

As shown in FIG. 1, five indicating lamps 19a, 19b, 19c, 19d, and 19e are arranged adjacent each other on the instrument panel 18 of a motor vehicle to illuminate respectively corresponding translucent panels carrying the respective legends "R", "$\frac{1}{4}$", "$\frac{1}{2}$", "$\frac{3}{4}$", and "V". These five indicating lamps may be incandescent lamps. Preferably however, in this embodiment of the invention five luminous diodes mounted on a conductor plate are used as the indicating lamps.

Each one of these luminous diodes 19 is earthed at one pole whilst the other pole thereof is connected to one of five outputs of an integrated switching circuit 20, whose inputs include an operating voltage (+12V) and output signals A, B of a signal generator 21 which includes two electrically conductive tracks 11, 12 mounted on an electrically non-conductive base plate 22.

Figure 2:
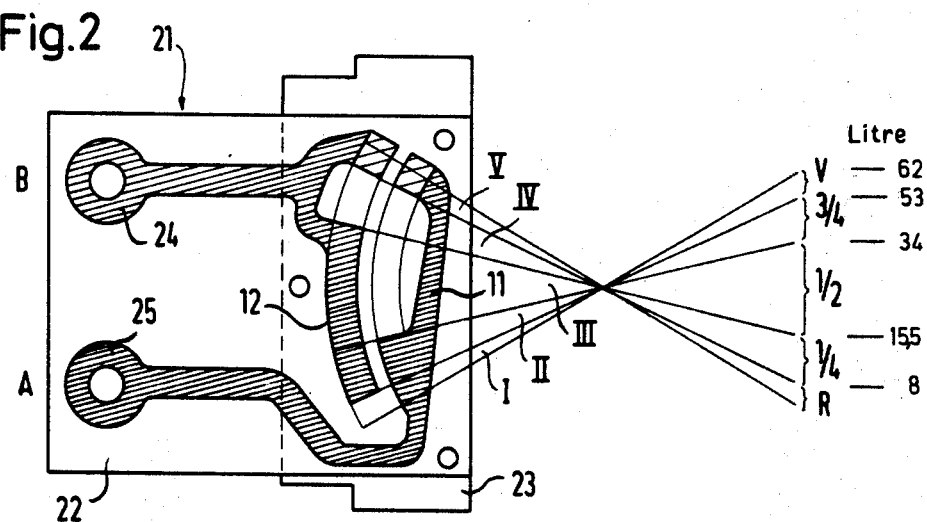
FIG. 2 is a schematic plan of the conductive tracks of the signal generator according to the invention.
Figure 3:
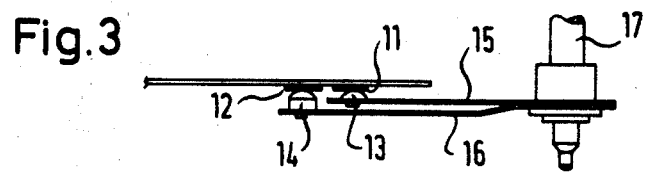
FIG. 3 is a front elevation of the conductive tracks with sliding contacts arranged thereon.

As illustrated in FIGS. 1 to 3, the conductive tracks 11, 12 are in sliding contact with two slidable contacts 13, 14 which are earthed and are connected, via pivoted superimposed arms 15, 16 to a common pivot shaft 17. This pivot shaft 17 is rotatable through a predetermined angle by means of a lever transmission (not shown) the angular position of which is controlled by a float resting on the surface of a layer of fuel in a fuel tank (not shown) of the vehicle. The angular position of the lever arms 15, 16 relative to the conductive tracks 11, 12 is therefore a measure of the fuel level in the tank.

As shown in FIGS. 2 and 3, the contacts 13, 14 are in sliding contact with the two conductive tracks 11, 12 which altogether are divided into five areas or regions I, II, III, IV, V. The allocation of the individual regions of these conductive tracks to the different fuel levels in the tank is illustrated schematically in FIG. 2.

According to the invention, the layout of the conductive tracks is designed in the manner indicated in FIG. 2. Movement of the slidable contacts 13, 14 over this layout of the conductive tracks produces signals designated, respectively, L1, L; O, O; O, L; L, L; and L, O; as the contacts 13, 14 move through regions V, IV, III, II and I.

Here, L1, L1 designate the output signals which are obtained when the sliding contacts 13, 14 are in the region V, in which region the conductive tracks have a very high resistance and allow only a limited current to pass. L1 is therefore a signal whose level lies between O and L. In this way, notwithstanding the fact that there are only two conductive tracks, five different binary coded digital signals are made possible.

In the integrated switching circuit 20, the input signals A. B are decoded in accordance with the following truth table:

| INPUT | | OUTPUT | | | | |
|---|---|---|---|---|---|---|
| A | B | OUTPUT TERMINALS | | | | |
| (11) | (12) | 1 | 2 | 3 | 4 | 5 |
| L1 | L1 | 1 | 0 | 0 | 0 | 0 |
| 0 | 0 | 0 | 1 | 0 | 0 | 0 |
| 0 | L | 0 | 0 | 1 | 0 | 0 |
| L | L | 0 | 0 | 0 | 1 | 0 |
| L | 0 | 0 | 0 | 0 | 0 | 1 |

Upon application of either of the input signals L and L1, the respective enabled output of the integrated switching circuit 20 delivers a voltage of 12V at a power output of 0.5 W. to the respective luminous diode. Thus, for example, when the input signals A and B are both L1, output terminal 1 of the integrated switching circuit 20 is enabled to energise the luminous diode 19a, so as to illuminate the translucent panel carrying the legend "R". Similarly, when the input signals A and B are both 0, output terminal 2 of the integrated switching circuit is enabled to cause the illumination of the translucent panel carrying the legend "¼" by the luminous diode 19b.

Thus, although only two conductive tracks 11 and 12 are used, it is possible to activate the five luminous diodes 19a to 19e, consecutively, to correspond with five distinct changes in the fuel level in the vehicle fuel tank.

The baseplate 22 is preferably mounted on a base plate 23.

In actual practice, a portion of the baseplate is bent over by an angle of 90° in the region of soldering eyelets 24, 25.

Preferably the total arc spanned by the length of the conductive tracks amounts to about 45°.

What is claimed is as follows:

1. A signal generator for a fluid-level indicator in a motor vehicle to monitor the fuel level in a fuel tank of said vehicle, said vehicle including an instrument panel having mounted thereon an illuminable display device, said display device comprising a plurality of illuminable display panels, each of which carries a visible inscription and is illuminable by a respective electrically-energizable light means, said fluid-level indicator including float means suspended in the fuel of said fuel tank, lever transmission means connected to said float means, and a pivot connected to said lever transmission means in such a manner that movement of the float means in response to changes in the fuel level produces corresponding pivotal movement of said pivot, said signal generator comprising digital binary coding means mechanically connectable to said pivot so as to transform the pivotal movement thereof into corresponding digital binary coded signals, and an integrated switching circuit for receiving said corresponding digital binary coded signals as inputs thereto, said switching circuit having a plurality of outputs therefrom, each one of which is connectable to a respective one of said respective energizable light means, each one of said outputs being enabled in sequence by the serial changes in the digital binary coded signals produced by the pivotal movement of said pivot through a predetermined angle corresponding to the movement of the float means produced by the change in fuel level between a predetermined minimum level and a predetermined maximum level.

2. A signal generator for a fluid-level indicator in a motor vehicle to monitor the fuel level in a fuel tank of said vehicle, said vehicle including an instrument panel having mounted thereon an illuminable display device, said display device comprising a plurality of illuminable display panels, each of which carries a visible inscription and is illuminable by a respective electrically-energizable light means, said fluid-level indicator including float means suspended in the fuel of said fuel tank, lever transmission means connected to said float means, and a pivot connected to said lever transmission means in such a manner that movement of the float means in response to changes in the fuel level produces corresponding pivotal movement of said pivot, said signal generator comprising digital binary coding means connectable to said pivot so as to transform the pivotal movement thereof into corresponding digital binary coded signals, and an integrated switching circuit for receiving said corresponding digital binary coded signals as inputs thereto, said switching circuit having a plurality of outputs therefrom, each one of which is connectable to a respective one of said respective energizable light means, said digital binary coding means comprising an electrically non-conductive baseplate, two separate conductive tracks mounted on said baseplate and spaced radially from one another with respect to said pivot, and two contact members, each one of which is connectable mechanically to said pivot so that said pivotal movement of said pivot produces a corresponding arcuate movement of the contact member relative to said baseplate, and is maintained in sliding contact with predetermined portions of a respective one of said conductive tracks during said arcuate movement, the two contact members being arcuately movable through a predetermined angle which corresponds to the movement of the float means produced by a change in fuel level between a predetermined minimum level and a predetermined maximum level, said movement through the predetermined angle producing a series of digital binary coded signals at the inputs to the switching circuit that sequentially enables the plurality of outputs therefrom.

3. A signal generator for a fluid-level indicator in a motor vehicle to monitor the fuel level in a fuel tank of said vehicle, said vehicle including an instrument panel having mounted thereon an illuminable display device, said display device comprising a plurality of illuminable display panels, each of which carries a visible inscription and is illuminable by a respective electrically-energizable light means, said fluid-level indicator including float means suspended in the fuel of said fuel tank, lever transmission means connected to said float means, and a pivot connected to said lever transmission means in such a manner that movement of the float means in response to changes in the fuel level produces corresponding pivotal movement of said pivot, said signal generator comprising digital binary means connectable to said pivot so as to transform the pivotal movement thereof into corresponding digital binary coded signals, and an integrated switching circuit for receiving said corresponding digital binary coded signals as inputs thereto, said switching circuit having a plurality of outputs therefrom, each one of which is connectable to a respective one of said respective energizable light means, said digital binary coding means comprising an electrically non-conductive baseplate, two separate conductive tracks mounted on said baseplate and spaced radially from one another with respect to said pivot, and two contact members, each one of which is connectable mechanically to said pivot so that said pivotal movement of said pivot produces a corresponding arcuate movement of the contact member relative to the surface of the baseplate, the two contact members being arcuately movable through a predetermined angle which corresponds to the movement of the float means produced by an change in fuel level between a predetermined minimum level and a predetermined maximum level, the two conductive tracks being so arranged on the surface of the baseboard that each contact member comes into sliding contact with a respective one of said conductive tracks at least once during said arcuate movement and a series of at least four different digital binary coded signals is produced at the inputs to the switching circuit that sequentially enables the plurality of outputs therefrom.

4. A signal generator according to claim 3, in which each one of the conductive tracks includes a portion thereof which comes into sliding contact with the respective contact member during said arcuate movement and has a substantially higher electrical resistance than the remainder of the conductive track.

5. A signal generator for a fluid-level indicator in a motor vehicle to monitor the fuel level in a fuel tank of said vehicle, said vehicle including an instrument panel having mounted thereon an illuminable display device, said display device comprising a plurality of illuminable display panels, each of which carries a visible inscription and is illuminable by a respective electrically-energizable light means, said fluid-level indicator including float means suspended in the fuel of said fuel tank, lever transmission means connected to said float means, and a pivot connected to said lever transmission means in such a manner that movement of the float means in response to changes in the fuel level produces corresponding pivotal movement of said pivot, said signal generator comprising digital binary coding means connectable to said pivot so as to transform the pivotal movement thereof into corresponding digital binary coded signals, and an integrated switching circuit for receiving said corresponding digital binary coded signals as inputs thereto, said switching circuit having a plurality of outputs therefrom, each one of which is connectable to a respective one of said respective energizable light means, said digital binary coding means comprising an electrically non-conductive baseplate, two separate conductive tracks mounted on said baseplate and spaced radially from one another with respect to said pivot, and two contact members, each one of which is mounted adjacent one end of a respective arm, the other end of which is connectable to said pivot so that pivotal movement of said pivot produces a corresponding arcuate movement of the contact member relative to the surface of the baseplate, the two arms carrying the contact members being superimposed upon one another with the two contact members being spaced radially from one another with respect to said pivot, the two contact members being arcuately movable through a predetermined angle which corresponds to the movement of the float means produced by an change in fuel level between a predetermined minimum level and a predetermined maximum level, the two conductive tracks being so arranged on the surface of the baseboard that each contact member comes into sliding contact with a respective one of said conductive tracks at least one during said arcuate movement and a series of at least four different digital binary coded signals is produced at the inputs to the switching circuit that sequentially enables the plurality of outputs therefrom.

* * * * *

UNITED STATES PATENT AND TRADEMARK OFFICE
CERTIFICATE OF CORRECTION

PATENT NO. : 4,144,521
DATED : March 13, 1979
INVENTOR(S) : Gunter Lehnert

It is certified that error appears in the above-identified patent and that said Letters Patent are hereby corrected as shown below:

Column 3, line 20, "L1 L;" should read -- L1, L1; --.

Column 6, claim 5, line 47, "one" should read -- once --.

Signed and Sealed this

Thirteenth Day of January 1981

[SEAL]

Attest:

SIDNEY A. DIAMOND

Attesting Officer

Commissioner of Patents and Trademarks